Aug. 26, 1941.   W. H. LEAVENWORTH   2,253,792
APPARATUS FOR CURING BELTS
Filed Feb. 13, 1937
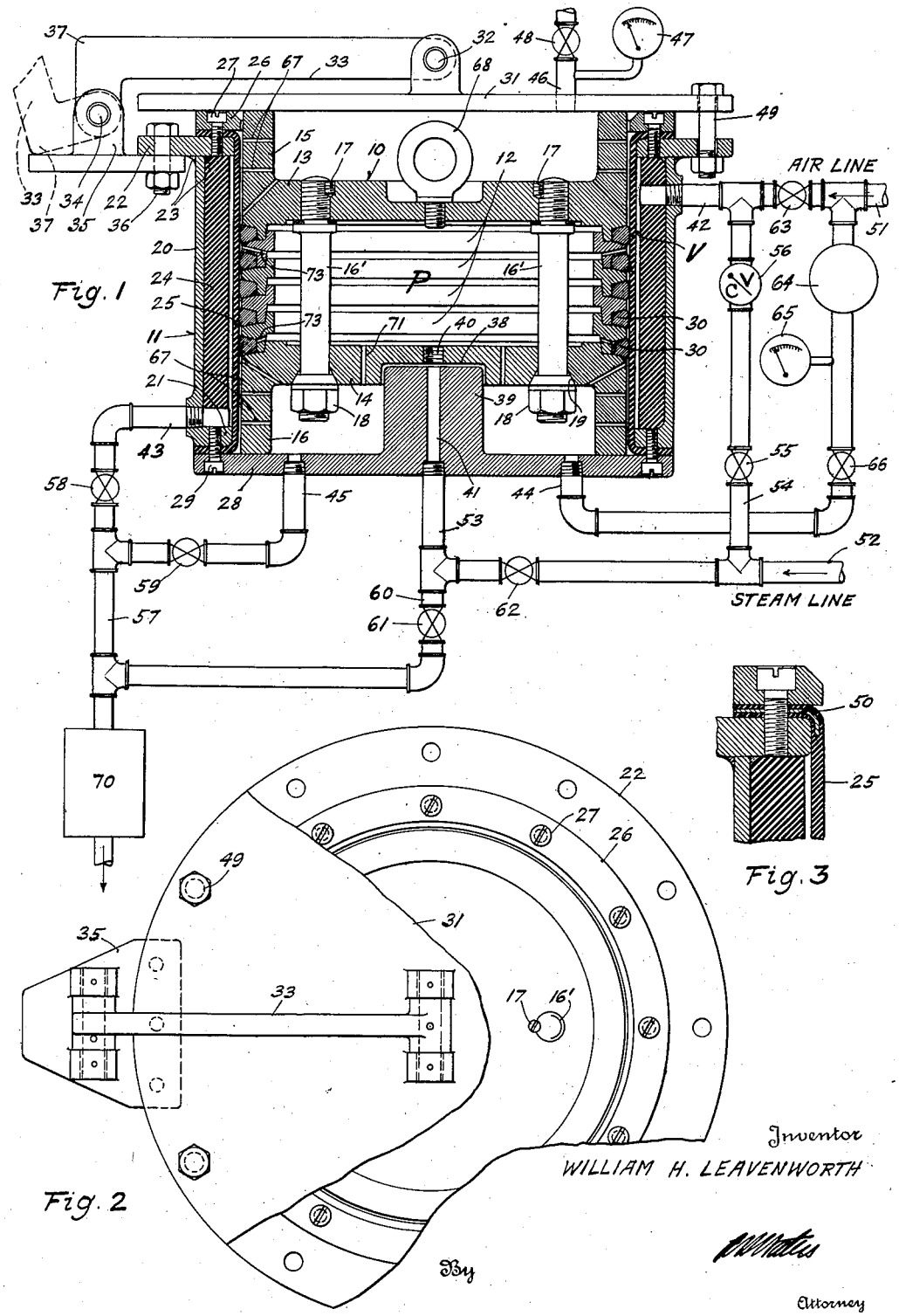
Inventor
WILLIAM H. LEAVENWORTH Patented Aug. 26, 1941

2,253,792

UNITED STATES PATENT OFFICE 2,253,792

APPARATUS FOR CURING BELTS

William H. Leavenworth, Akron, Ohio, assignor to Wingfoot Corporation, Wilmington, Del., a corporation of Delaware Application February 13, 1937, Serial No. 125,587

14 Claims. (Cl. 18—6)

The present invention relates to a method and apparatus for curing belts, particularly of the V-belt type, and has for one of its objects the elimination of the usual step of wrapping the V-belts after they have been mounted in the mold rings and before the same are placed in the curing chamber.

Another object of this invention is to provide a curing ring assembly and a chamber therefor which may be readily assembled and which cooperate in such a manner as to eliminate the necessity of any wrap about the exposed surfaces of the V-belts.

Another object of this invention is to provide a curing chamber with a flexible diaphragm expansible by fluid pressure for enveloping exposed surfaces of the V-belts when the same are mounted on the mold ring assembly.

Another object of this invention is to provide a mold ring assembly for embracing all but the outer surfaces of the V-belts to be cured, and providing a cooperating curing chamber having a flexible diaphragm expansible under fluid pressure to embrace the outer exposed surfaces of the V-belts, whereby the belts are confined during the curing operation.

Another object of this invention is to provide means for curing V-belts in a mold ring and confining the belts in the mold ring at least partially by a flexible diaphragm.

Another object of this invention is to provide means for confining V-belts in a mold ring by at least partially embracing the belts with a flexible diaphragm urged by fluid pressure against the outer surfaces of the belts.

Another object of this invention is to provide a curing device whereby air, steam or a combination of air and steam may be used to effect the cure of the articles to be vulcanized.

Still another object is to provide a means and method of curing articles which eliminates certain wrapping operations heretofore mentioned and particularly with respect to articles such as V-belts.

Other objects of this invention will appear hereinafter as the description hereof proceeds, the novel features, arrangements and combinations being clearly set forth in the specification and in the claims thereunto appended.

In the drawing,

Fig. 1 represents a vertical cross-sectional view taken centrally of the curing unit showing the manner in which the assembled mold rings are arranged within the curing chamber, Fig. 2 is a plan view of the curing chamber with parts broken away;

Fig. 3 is an enlarged cross-sectional view showing a detail of applicant's diaphragm mounting.

It has been customary in the curing of V-belts, particularly V-belts which are formed as continuous bands, to assemble these belts in a series of mold rings which embrace all but the outer surface of the belts. Since it is necessary to also confine the outer surfaces of the belts, the customary practice has been to employ heavy canvas strips or the like wrapped snugly about the assembled belts, whereby during the curing of the belts in the curing chamber the belts are maintained in proper shape and are held under pressure. This operation of wrapping the belts consumes appreciable time and care and the wrapping material must also be unwrapped after the belts have been cured. Furthermore, the pressure on the belts depends upon the individual operator applying the wrap and this is not always uniform.

It is the main purpose of this invention to eliminate the necessity of using a wrap, such as has been customary in this art, and to simplify the operation of curing the belts as well as to insure a greater uniformity in the pressure applied to the belts during the curing operation. The wrapping of the articles is eliminated by the use of a curing chamber having a flexible diaphragm forming one wall of an expansible pressure chamber, which flexible diaphragm under the pressure in said chamber moves against the outer surfaces of the said belts and confines them within the recesses provided by the cooperating mold rings.

Referring now more particularly to the drawing, the reference character 10 indicates generally the mold ring assembly and 11 indicates the pressure chamber in which the mold rings are placed for curing. The mold rings are assembled in somewhat the usual manner, but some changes have been made in the construction of the end or pressure rings to further the objects of this invention and to increase the rigidity of the assembled mold rings, whereby to eliminate warping, etc.

The mold ring assembly comprises the usual series of super-imposed rings 12 which are formed with cutaway portions at their peripheries, these cutaway portions cooperating to form substantially V-shaped recesses peripherally of the unit, these grooves receiving the belts to be cured and being deep enough so as to substantially entirely receive the belts, as is clearly illustrated in Fig. 1. The end or pressure rings 13 and 14 are provided with annular, axially extending flanges 15 and 16, respectively, for imparting rigidity to these rings and for another purpose which will appear hereinafter. The assembled rings are held in clamped relation by means of stud bolts 16' secured against turning in end ring 13 by means of set screws 17. The opposite ends of the stud bolts pass through openings in the end ring 14 and are provided with nuts 18 threaded on the ends of the stud bolts 16'. These nuts have beveled seats 19 cooperating with corresponding beveled seats in the mold ring and, by tightening the nuts 18, the rings 12, 13 and 14 are held in assembled relation in the manner illustrated clearly in Fig. 1.

The curing chamber is provided with a cylindrical outer wall 20 having an inwardly extending annular flange 21 at the lower end thereof. To the upper side of the outer wall 20 is secured an annular ring 22, a portion of which extends inwardly of the cylindrical wall and a portion of which extends outwardly thereof.

This ring is secured to the annular wall in any suitable manner as by welding or brazing, as at 23. Inwardly of the outer wall and arranged between the ring 22 and the flange 21 is an annular body of rubber 24, and spaced from this only a slight distance is an annular diaphragm 25. The upper edge of this annular diaphragm is clamped against the upper surface of the ring 22 by means of a clamping ring 26 held in place by means of machine screws such as 27 or the like. The lower peripheral edge of the annular diaphragm is clamped against the under side of the flange 21 by means of the plate 28 which forms the bottom of the chamber and this in turn is clamped to the flange 21 in any suitable manner as by machine screws 29. This in effect provides a curing chamber having an annular diaphragm forming the inner peripheral wall thereof, the same being adapted to be expanded against the outer surfaces of the V-belts 30 whereby to hold the V-belts firmly in operative position in their recesses during the curing operation.

The upper side of the chamber is closed by a cover 31 pivoted at 32 to an arm 33, which in turn is pivoted at 34 to a bracket 35 secured by bolts 36 to the ring 22. It is obvious that in the swinging of the arm 33 to the dotted-line position shown in Fig. 1 the cover 31 will be conveyed with the arm to a position such as to expose the ring assembly 10 and permit the removal or insertion thereof. The angular portion 37 of the arm 33 forms a stop which limits the counter-clockwise movement of the arm whereby the cover is held in a position just to one side of the curing chamber. The cover contacts ring 13 to hold the same in place or at least lies close enough thereto to prevent excessive axial shifting thereof, which shifting might cause relative shifting between the belts and the curing diaphragm 25 or excessive stretching vertically of that portion of the diaphragm below the bottom belt, which stretching would decrease the life of the diaphragm. If the mandrel were permitted to move vertically the friction between the diaphragm and the lowermost belt caused by the pressure in the chamber V would cause this portion of the diaphragm to move upwardly with the mandrel and cause the aforesaid stretching.

The ring 14 is recessed at 38 to receive the cylindrical boss 39 projecting upwardly from the base 28, and this ring is also provided with a bore 40 adapted to communicate with the bore 41 in the boss 39, whereby steam may be introduced into the hollow interior of the assembled rings 12, 13 and 14. This hollow interior will be referred to hereinafter as the pressure chamber P. The chamber between the diaphragm 25 and the annular rubber member 24 will be referred to as pressure chamber V. This pressure chamber V has an inlet 42 for air and an outlet 43 leading to a drain whereby entrapped water may be removed and the air pressure released. The bottom of the pressure chamber is provided with an air inlet 44 and a drain 45 to remove moisture therefrom. The cover 31 of the pressure chamber is provided with an outlet 46 communicating with a pressure gauge 47 and a valve 48, which latter valve 48 permits the release of pressure, if any, within the curing chamber, whereby the pressure in the curing chamber is released before the cover 31 is moved to open position. The cover 31 is releasably held in operative position by clamping bolts 49 or any other suitable means.

In Fig. 3 I have illustrated a detail of the diaphragm 25. This diaphragm is preferably made entirely of rubber or other suitable flexible material and in employing rubber it is preferable to reenforce the upper and lower annular peripheral edges thereof by embedding a strip of fabric 50 therein. These reenforced edges are the portions which are clamped and the fabric prevents tearing of the diaphragm at the point where the diaphragm is clamped.

In Fig. 1 I have illustrated the preferred hook-up of the pipes leading to and from the curing unit and it is to be understood that this is merely illustrative of my invention and is not limiting. A pressure airline is shown at 51 and a pressure steam line at 52. The pressure steam line is connected with a pipe 53 communicating with the bore 41 in the boss 39 and has a branch connection 54 connected to the air line 51, this branch connection having a cutoff valve 55 therein and also a check valve 56, whereby if desired steam can be introduced through the conduit 54, valves 55 and 56 and conduit 42 to the pressure chamber V.

The use of steam in chambers V and P reduces considerably the length of time necessary for proper curing. The check valve 56 prevents the air in conduit 51 from entering the steam line 52 and lowering the temperature of that curing medium.

The conduits 43 and 45 are connected to a drain pipe 57 provided with a steam trap 70 and valves 58 and 59 control the flow of the fluid to the drain from the pressure chamber V and from the bottom of the curing chamber respectively. The conduit 53 also has communication with a conduit 60 which leads to the drain pipe 57 and this conduit 60 has a valve 61 therein which is normally open when the steam and/or air is entering the pressure chamber V.

The valve 59 may also be and is preferably open at all times whereby condensation may continuously drain into the trap and be periodically discharged thereby. To permit proper drainage of the condensation from the curing unit the bore 38 is large enough to permit flow of condensation around the boss 39. Additionally the ring 14 may be provided with drain openings such as 71 for the same purpose. The air line 51 is provided with a valve 63. Regulator 64 and pressure gauge 65 are arranged in the branch air line 44 leading to the interior of the curing unit for regulating and indicating the pressure of the air entering the curing chamber through branch conduit 44 either for curing purposes or for forcing back the diaphragm 25. A valve 66 is used to normally prevent air from entering the curing chamber.

In the operation of this device after the mold ring unit or mandrel has been assembled and placed within the curing unit and the cover bolted down, the valve 63 is opened to permit the air to enter the pressure chamber V, whereby to expand the flexible diaphragm against the outer surfaces of the V-belts to hold them firmly within their respective recesses. Thereafter steam is introduced into the pressure chamber P by opening the valve 62. The steam pressure is lower than the air pressure so that the belts are not forced off their seats during the curing operation. The condensation falls to the bottom of the chamber P and the pressure diaphragm 25 prevents the escape of steam between the diaphragm and the outside of the ring assembly, due to the differential in the air and steam pressures used, and, as a result, no pressure builds up between the top mold ring 13 and the cover 31 during the curing operation.

After the curing operation, the pressure is first reduced in the pressure chamber P and when the pressure has dropped to a very small amount, say five pounds, the air in the chamber V is released through the drain 43 by opening the valve 58. The residual five pounds of steam pressure in the curing unit helps to release the diaphragm from its engagement with the belts for there is now no pressure behind the diaphragm and the steam will pass through openings 67 in the ring 14 and upwardly between the diaphragm and curing mandrel. Also residual steam in chamber P will pass through openings such as 73 distributed at intervals around the rings 12 to release the belts from their seats. Air under pressure can also be used to separate the diaphragm from the mandrel if necessary by introducing same through the conduit 44. Since it is not desirable to have air at high pressures for this purpose, the regulator 64 is interposed in this branch of the air supply for regulating the pressure of the air. To aid in removing the mandrel or assembled rings from the chamber, an eye bolt 68 is provided, the same being screw-threaded into the upper mold ring 13.

The flanges 15 and 16 are perforated as at 67 to permit the air to be introduced between the diaphragm and mandrel and to permit drainage of condensation. These flanges also serve to prevent inward movement of the upper and lower portions of the diaphragm when the air pressure has been built up in the chamber V.

It will be noted from an inspection of Fig. 1 that the diaphragm is clamped at points remote from the outermost belts in the series. This is done for the purpose of lengthening the life of the diaphragm. A more uniform pressure develops at the central or clamping portion of the diaphragm, since this portion is more free to move than the portions adjacent the clamped edges thereof. Therefore, there is less opportunity for a break-down of the diaphragm adjacent the clamping portions.

It will be noted from an inspection of the drawing that I have produced a curing chamber in which there is provided a diaphragm so arranged and constructed as to minimize stretching thereof in any direction. Stretching in the plane of the diaphragm is minimized by preventing excessive shifting of the mandrel. Only a narrow chamber is provided at V so that the diaphragm does not have to move a great amount to bring it into contact with the belts nor have to move a great amount when being retracted therefrom. Also, by providing clamping means remote from the belt-contacting portion of the diaphragm, stretching of the diaphragm adjacent the clamped portions thereof is greatly reduced.

Also with the arrangement shown the portions near the clamped edges of the diaphragm do not have any excessive strain placed on them and the diaphragm therefore will last longer.

It will be noted that, with the arrangement of the fluid supply, either air or steam or both can be introduced into the curing chamber so that if desired a steam air cure may be used.

Obviously, those skilled in the art to which the invention relates may make various changes in the particular arrangement and construction of the parts shown in the accompanying drawing without departing from the spirit or scope of this invention and, therefore, I do not wish to limit myself except as may be hereinafter set forth in the claims hereunto appended.

Having thus fully described my invention, what I claim and desire to secure by Letters Patent of the United States is:

1. A curing unit for curing V-belts and the like which comprises an arbor formed of a series of rings having cooperating portions forming annular recesses when said rings are assembled axially, means for holding said rings in assembled axial relation, a curing chamber having a peripheral flexible diaphragm interiorly thereof and arranged to lie over the recesses in the arbor when said arbor is arranged within said chamber, means for introducing fluid under pressure behind said diaphragm to force the same inwardly against said arbor and to confine articles arranged within said recesses firmly within said recesses during the curing operation, and means for introducing fluid under pressure to the other side of said flexible diaphragm to release the same from the surface of said arbor and the articles arranged within the recesses thereof, whereby removal of said arbor from the chamber may be effected.

2. A curing unit comprising an annular chamber having an interiorly arranged annular flexible diaphragm, an arbor having peripheral recesses for the reception of articles to be cured, the interior of said arbor being hollow to receive a curing medium, releaseable coupling means on said arbor and chamber adapted to cooperate when said arbor is arranged within said chamber for connecting the interior of said arbor with a source of fluid curing means, means for introducing fluid under pressure behind said diaphragm to force the same against the exterior surface of the arbor and the articles arranged within the recesses therein, and means for introducing fluid under pressure to the other side of said flexible diaphragm to release the same from the surface of said arbor and the articles arranged within the recesses thereof, whereby removal of said arbor from the chamber may be effected.

3. A curing unit comprising a chamber having a flexible diaphragm forming an interior wall thereof, a fluid-pressure chamber behind said diaphragm for actuating said diaphragm, an article-carrying arbor adapted to be arranged within said chamber with portions of the article exposed and adapted to be contacted by said diaphragm, a curing chamber within said arbor, means for introducing a curing medium into said arbor means for introducing fluid under pressure into said pressure chamber behind said diaphragm to move said diaphragm against the exposed surfaces of the articles carried by said diaphragm and means for introducing fluid under pressure to the opposite face of said diaphragm to release the same from contact with said arbor and the articles confined therein.

4. A curing unit comprising a substantially cylindrical chamber closed at one end and having a fixed boss arranged centrally within the chamber at the closed end thereof, said boss having a passage therethrough, means for supplying a curing medium to said passage, an arbor within the chamber and having one or more article-receiving cavities peripherally thereof and having an axial recess to receive said boss, said arbor being hollow and having a passage communicating with the passage in the boss to receive the curing medium supplied through said boss, a flexible diaphragm positioned about said arbor means for introducing fluid pressure behind said diaphragm to force the diaphragm into contact with the exposed surface of articles within said recesses in said arbor, and means for holding said arbor in assembled relation within said curing unit during the curing operation.

5. A curing unit comprising a substantially cylindrical curing chamber having a cylindrical, flexible diaphragm, a cylindrical arbor disposed within said curing chamber and having mold recesses in the periphery thereof, means for centering said cylindrical arbor concentrically with respect to said diaphragm, means for holding said arbor in its centered position within said chamber, means for introducing fluid under pressure behind said diaphragm to hold the same against the outer surfaces of the articles to be cured to confine the same within said recesses, and means for introducing a curing medium within said chamber for curing the articles confined within the recesses in said arbor.

6. A curing unit comprising a substantially cylindrical curing chamber having a cylindrical, flexible diaphragm constituting a diaphragm, a cylindrical arbor disposed within said curing chamber and having mold recesses in the periphery thereof, means for centering said cylindrical arbor concentrically with respect to said diaphragm, means for holding said arbor in its centered position within said chamber, means for introducing fluid under pressure behind said diaphragm to hold the same against the outer surfaces of the articles to be cured to confine the same within said recesses, and means for introducing a curing medium interiorly of said arbor.

7. A curing unit comprising a substantially cylindrical curing chamber having a cylindrical, flexible diaphragm constituting a diaphragm, a cylindrical arbor disposed within said curing chamber and having mold recesses in the periphery thereof, means for centering said cylindrical arbor concentrically with respect to said diaphragm, means for holding said arbor in its centered position within said chamber, means for introducing fluid under pressure behind said diaphragm to hold the same against the outer surfaces of the articles to be cured to confine the same within said recesses, and means for introducing steam and air into said arbor for curing the articles confined within the recesses in said arbor.

8. A curing unit comprising a cylindrical pot chamber having one end thereof closed, a cover for closing the other end of said chamber, a flexible cylindrical diaphragm covering the inner peripheral wall of said chamber substantially throughout its entire extent, a hollow cylindrical arbor formed of nested rings and having peripheral recesses to receive articles to be cured arranged substantially centrally of said chamber, the sides of said recesses partially embracing said articles, and means for introducing fluid under pressure behind said diaphragm to force the same inwardly against the exposed surfaces of the articles in said arbor.

9. A curing unit comprising a cylindrical pot chamber having one end thereof closed, a cover for closing the other end of said chamber, a flexible cylindrical diaphragm covering the inner peripheral wall of said chamber substantially throughout its entire extent, a hollow cylindrical arbor formed of nested rings and having peripheral recesses to receive articles to be cured arranged substantially centrally of said chamber, the sides of said recesses partially embracing said articles and means for introducing fluid under pressure behind said diaphragm to force the same against the exposed surfaces of the articles in said arbor, the closed end of said chamber having an inlet adapted to communicate with an inlet in the hollow arbor when said arbor is in position within said chamber for introducing a curing medium into said arbor.

10. A curing unit comprising a cylindrical pot chamber having one end thereof closed, a cover for closing the other end of said chamber, a flexible cylindrical diaphragm covering the inner peripheral wall of said chamber substantially throughout its entire extent, a hollow cylindrical arbor having peripheral recesses to receive articles to be cured arranged substantially centrally of said chamber, the sides of said recesses partially embracing said articles and means for introducing fluid under pressure behind said diaphragm to force the same against the exposed surfaces of the articles in said arbor, the closed end of said chamber having an inlet adapted to communicate with an inlet in the hollow arbor when said arbor is in position within said chamber for introducing a curing medium into said arbor, and said arbor being provided with relatively small openings at the lower side thereof to permit the drainage of condensation from the interior of said hollow arbor to the bottom of said chamber.

11. The combination with a substantially closed chamber having at least one removable end, of a diaphragm forming one wall of said chamber, an arbor releaseably arranged within said chamber and having at least one article-receiving surface thereon arranged adjacent said diaphragm when said arbor is within said chamber, whereby said diaphragm may be forced against the article on said surface, means for introducing a curing medium behind said diaphragm to force said diaphragm against the article to be cured, and means for introducing fluid under pressure against the opposite side of said diaphragm to release the same from engagement with the article.

12. In a curing unit the combination with a chamber having a substantially cylindrical peripheral wall and closed only at one end thereof, of a cover for closing the open end of said chamber, an arbor for carrying articles to be cured on the outer peripheral surface thereof, releaseably centered within said chamber, means for holding said cover in position over the open end of said chamber to seal said chamber, and means for introducing a curing medium under pressure behind said diaphragm to force the same against the article to be cured.

13. The combination with a substantially closed chamber having a removable side of a diaphragm forming one wall of said chamber, an arbor releaseably arranged within said chamber and having at least one article-receiving surface thereon arranged adjacent said diaphragm when said arbor is within said chamber, whereby said diaphragm may be forced against the article on said surface, means for introducing a curing medium behind said diaphragm to force said diaphragm against the article to be cured, means for introducing fluid under pressure against the opposite side of said diaphragm to release the same from engagement with the article.

14. A curing unit for vulcanizing articles comprising a cylindrical outer wall and end walls, at least one of said end walls being removable to permit access to the interior of said unit, said cylindrical outer wall having a continuous diaphragm arranged over the interior surface thereof and secured thereto at the opposite ends of said cylindrical outer wall whereby to form an expansible chamber, and means for introducing fluid under pressure between said outer wall and diaphragm to expand said diaphragm inwardly, and an article-carrying unit arranged within said chamber in a position such that said diaphragm will contact articles supported thereon.

WILLIAM H. LEAVENWORTH.